United States Patent
Sloan et al.

(10) Patent No.: US 6,268,974 B1
(45) Date of Patent: Jul. 31, 2001

(54) GAIN OPTIMIZATION IN A DISC DRIVE

(75) Inventors: Brett A. Sloan; Paul F. Kusbel, both of Edmond; John E. Moon, Oklahoma City; Tim Walker, Edmond, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/352,433

(22) Filed: Jul. 13, 1999

Related U.S. Application Data
(60) Provisional application No. 60/092,632, filed on Jul. 13, 1998.

(51) Int. Cl.⁷ ................................................. G11B 5/02
(52) U.S. Cl. .................................................. 360/67; 360/46
(58) Field of Search .................... 360/46, 67; 330/124, 330/133, 134

(56) References Cited

U.S. PATENT DOCUMENTS

| | | |
|---|---|---|
| 3,879,342 | 4/1975 | Patel . |
| 4,000,513 | 12/1976 | Precourt . |
| 4,205,352 | 5/1980 | Tomada . |
| 4,245,264 | 1/1981 | Allen . |
| 4,306,257 | 12/1981 | Harman . |
| 4,635,141 | 1/1987 | Coulter . |
| 4,799,112 | 1/1989 | Bremmer et al. . |
| 4,821,125 | 4/1989 | Christensen et al. . |
| 4,907,109 | 3/1990 | Seniō . |
| 4,937,689 | 6/1990 | Seaver et al. . |
| 4,965,501 | 10/1990 | Hashimoto . |
| 5,025,327 | 6/1991 | Stamness et al. . |
| 5,047,876 | 9/1991 | Genheimer et al. . |
| 5,107,378 | 4/1992 | Cronch et al. . |
| 5,262,907 | 11/1993 | Duffy et al. . |
| 5,381,282 | 1/1995 | Arai et al. . |
| 5,408,367 | 4/1995 | Emo . |
| 5,430,768 | 7/1995 | Minuhin et al. . |
| 5,459,757 | 10/1995 | Minuhin et al. . |
| 5,606,464 | * 2/1997 | Agazzi et al. ........................ 360/46 |
| 5,610,776 | 3/1997 | Oh . |
| 5,631,999 | 5/1997 | Dinsmore . |
| 5,680,272 | 10/1997 | Kadlec et al. . |
| 5,687,036 | 11/1997 | Kassab . |
| 5,717,538 | 2/1998 | Cheung et al. . |
| 6,141,169 | * 10/2000 | Pietruszynski et al. ............... 360/67 |
| 6,178,053 | * 1/2001 | Narita ................................. 360/25 |

\* cited by examiner

*Primary Examiner*—David Hudspeth
*Assistant Examiner*—Dau I. Davidson
(74) *Attorney, Agent, or Firm*—Crown & Dunlevy

(57) ABSTRACT

Apparatus and method for selecting an optimum gain for an amplifier used to amplify readback signals transduced from a magnetic recording disc in a disc drive. The amplifier is provided with a first value of gain, which is used to amplify a readback signal to generate an amplified readback signal. The amplified readback signal is in turn applied to an automatic gain control circuit comprising a variable gain amplifier. The variable gain amplifier applies a variable gain from a selected range to the amplified readback signal to maintain an amplitude of an output signal provided by the automatic gain control circuit at a nominal amplitude. The acceptability of the first value of gain for subsequent use by the amplifier is determined in relation to a magnitude of the variable gain applied by the variable gain amplifier.

12 Claims, 3 Drawing Sheets

GAIN OPTIMIZATION IN A DISC DRIVE

RELATED APPLICATIONS

This application claims the benefit of United States Provisional Application No. 60/092,632 filed Jul. 13, 1998.

FIELD OF THE INVENTION

This invention relates generally to the field of disc drive data storage devices, and more particularly, but not by way of limitation, to an apparatus and method for improving operational performance of a disc drive servo circuit.

BACKGROUND

A disc drive is a data storage device used to store and retrieve computerized data in a fast and efficient manner. Generally, a disc drive comprises a head/disc assembly (HDA) which houses mechanical portions of the drive and a printed wiring assembly (PWA) which supports electronics used to control the operation of the drive.

The HDA includes a base deck which supports a spindle motor used to rotate one or more rigid discs at a constant high speed. The discs are coated with a nonvolatile medium to which data are magnetically stored and retrieved by an array of transducers ("heads") mounted to a rotary actuator. The heads are supported over the corresponding disc surfaces by air bearings set up by the rotation of the discs and controllably positioned in response to the application of current to an actuator coil which forms a portion of a voice coil motor (VCM).

A processor based, digital servo circuit such as discussed in U.S. Pat. No. 5,262,907 issued to Duffy et al., assigned to the assignee of the present invention, provides closed loop positional control of the heads. Servo data are written to each of the disc surfaces during disc drive manufacturing as a plurality of servo fields which are arranged as radially extending wedges which extend from the inner to the outer diameters of the discs. The servo data define a plurality of concentric tracks on each of the surfaces. User data are stored on the tracks in user data fields (sectors) which are subsequently defined between adjacent servo wedges during a disc drive formatting operation.

The servo circuit provides two main operations: track following, wherein the selected head is maintained over a particular track on the corresponding disc surface, and seeking, wherein currents are applied to initially accelerate and then decelerate the head from an initial track to a destination track on the disc surface. Proper operation of the servo circuit requires accurate detection and processing of the servo data from the disc surfaces.

It is common to provide a preamplifier circuit in proximity to the heads in order to provide preamplification of readback signals transduced by the heads in order to reliably transmit the signals to the disc drive PWA. The readback signals are initially provided to a read/write channel, with the readback signals from the user data fields being reconstructed into the originally supplied data by the host computer. The readback signals from the servo fields are passed from the read/write channel to a demodulator of the servo circuit, which conditions the servo data for use by the servo processor.

To support high volume manufacturing efforts, it is increasingly common for disc drive manufacturers to produce large numbers of nominally identical disc drives which have individually selectable electronic parameters which are adjusted during disc drive manufacturing and field operation to ensure the drive continues to operate at acceptable levels of performance. Examples of such parameters include read and write current levels used by the heads, tap weights and timing values used by the read/write channel, detection thresholds used by the servo circuit, etc. Nevertheless, because of limitations associated with high volume manufacturing environments, the sheer number of parameters available for adaptation makes it economically unfeasible to individually optimize every available parameter in every drive; hence, disc drive manufacturers typically attempt to adapt those parameters which have the greatest impact on the operational performance of the drive and provide default, global settings for remaining parameters.

As disc drives continue to be provided with ever increasing data storage capacities and levels of data transfer rate performance, as well as significantly greater levels of parametric adaptation capabilities, there remains a continued need for ways to efficiently and quickly select optimum parameter values to improve disc drive operational performance. It is to such improvements that the present invention is directed.

SUMMARY OF THE INVENTION

The present invention is directed to an apparatus and method for improving operational performance of a disc drive through the selection of an optimum gain used to amplify readback signals transduced from a magnetic recording disc.

In a preferred embodiment, a disc drive includes an amplifier which is used to amplify readback signals transduced from a head. The amplifier is provided with a first value of gain, which is used to amplify a readback signal to generate an amplified readback signal. The amplified readback signal is in turn applied to an automatic gain control circuit comprising a variable gain amplifier. The variable gain amplifier applies a variable gain from a selected range to the amplified readback signal to maintain an amplitude of an output signal provided by the automatic gain control circuit at a nominal amplitude. The first acceptable value of gain for subsequent use by the amplifier is determined in relation to a magnitude of the variable gain applied by the variable gain amplifier.

These and various other features and advantages which characterize the present invention will be apparent from a reading of the following detailed description and a review of the associated drawings.

DETAILED DESCRIPTION

Figure 1:
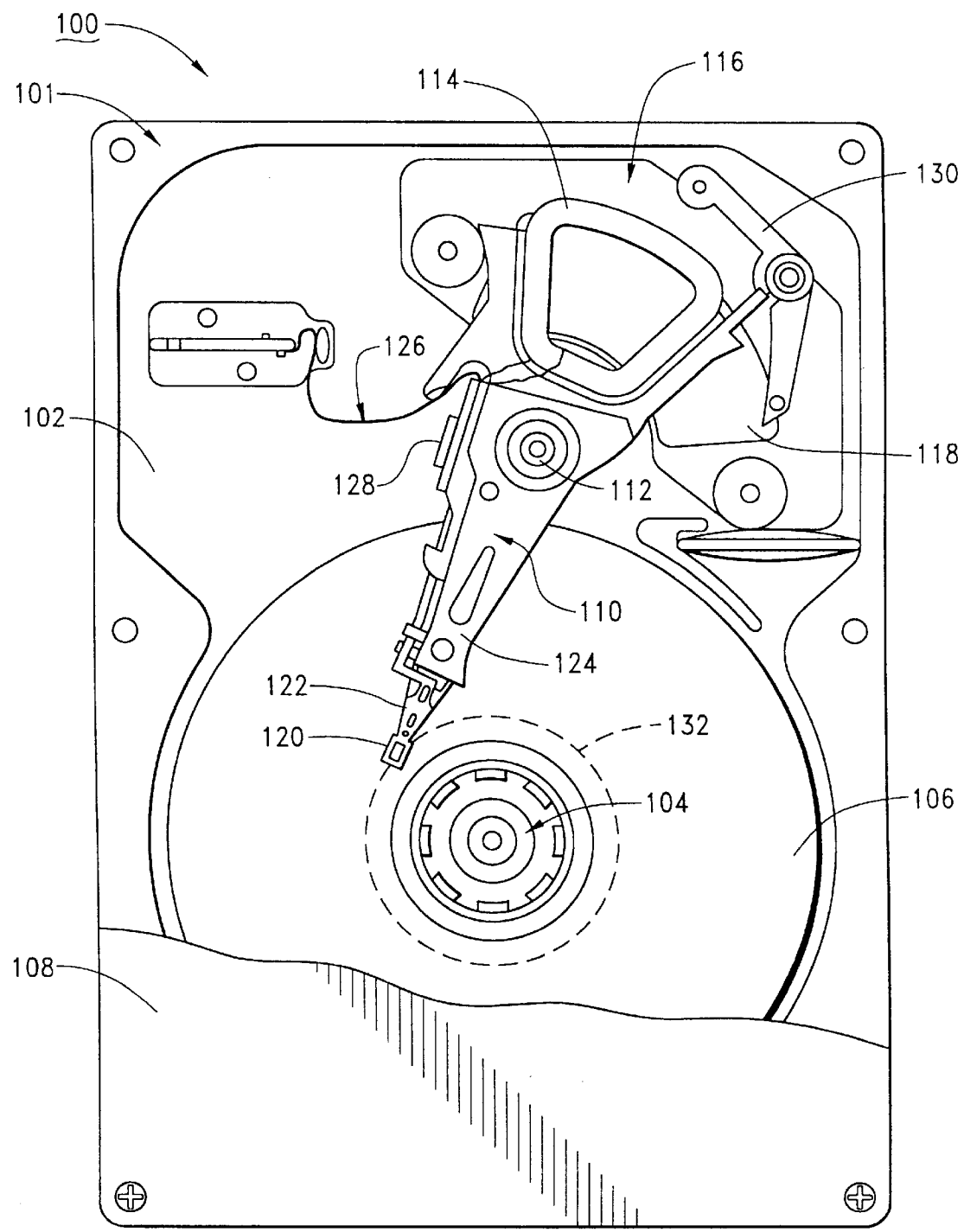
FIG. 1 provides a top plan view of a disc drive constructed in accordance with preferred embodiments of the present invention.

Referring now to the drawings, FIG. 1 shows a top plan view of a disc drive 100 constructed in accordance with preferred embodiments of the present invention. The disc drive 100 includes a head/disc assembly (HDA) 101 and a printed wiring assembly (PWA) supporting control electronics used by the disc drive 100. The PWA is mounted to the underside of the HDA 101 and hence, is not visible in FIG. 1.

The HDA 101 includes a base deck 102 which supports a spindle motor 104 used to rotate a plurality of discs 106 at a constant high speed. A series of concentric tracks are defined on each of the disc surfaces using servo data written to the disc drive 100 during manufacturing in a conventional manner. A disc clamp (not designated) secures the discs 106 and a series of disc spacers disposed between adjacent discs to the spindle motor 104. A top cover 108, shown in partial cutaway fashion, mates with the base deck 102 to provide an internal environment for the HDA 101.

A rotary actuator 110 is configured for rotation about a cartridge bearing assembly 112 supported by the base deck 102. The actuator 110 is rotated through controlled application of current to an actuator coil 114 of a voice coil motor VCM) 116 having a pair of opposing permanent magnets, one of which is shown at 118. The current establishes a magnetic field which interacts with the magnetic field of the permanent magnets 118 to rotate the actuator 110.

A plurality of heads 120 are supported by the actuator 110 over each of the disc surfaces by corresponding flexible suspension assemblies 122, which in turn are supported by rigid actuator arms 124 which project from the body of the actuator 110. Electronic read and write signals are passed from the heads 120 to the aforementioned disc drive PWA using a flex circuit assembly 126 which includes a preamplifier/driver circuit 128 mounted to the side of the actuator 110 as shown. A magnetic inertial latch 130 secures the heads 120 over texturized landing zones 132 on the disc surfaces when the disc drive 100 is deactivated.

Figure 2:
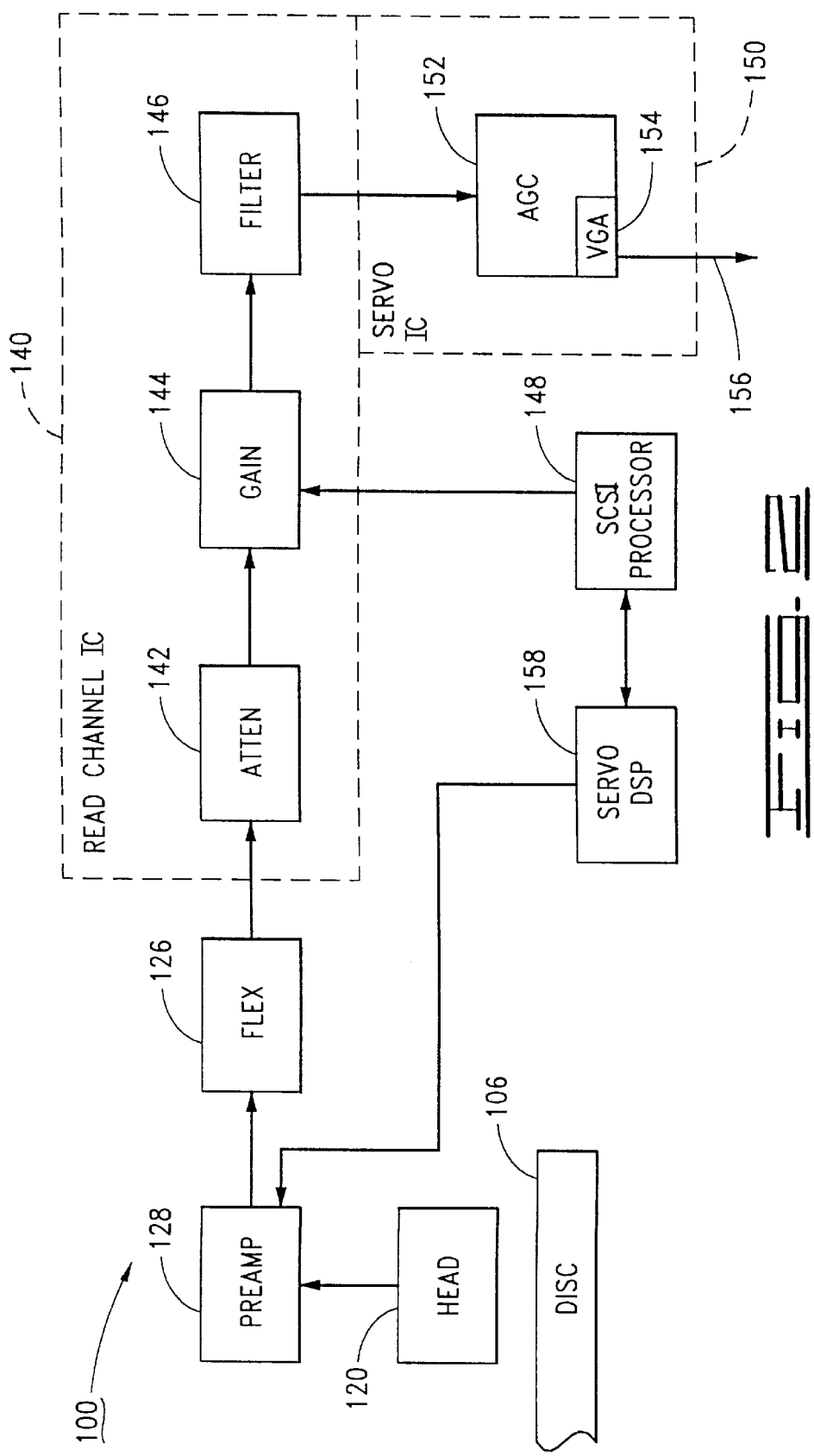
FIG. 2 provides a functional block diagram of portions of the disc drive of FIG. 1.

FIG. 2 shows a functional block diagram of selected portions of the disc drive 100, including circuitry disposed on the aforementioned disc drive PWA. Particularly, readback signals from servo fields on the disc 106 are tranduced by the head 120 and passed to the preamp 128 (FIG. 1) and through the flex circuit assembly 126 to a read channel 140. The read channel 140, which can be incorporated into a single integrated circuit (IC) as shown or segregated among different ICs, is shown to include an attenuator 142, a gain stage 144 and a high order filter 146. As the disc drive 100 is contemplated as preferably utilizing a small computer system interface (SCSI) input/output (I/O) configuration, a SCSI processor 148 is shown which provides top level control of the disc drive 100.

A servo circuit 150 receives the output of the filter 146 and includes an automatic gain control circuit (AGC) 152 which normalizes the input signal to a level suitable for use by remaining portions of the servo circuit 150. As is conventional, the AGC 152 includes a variable gain amplifier (VGA) 154 which has the capability of adjusting an internal gain used to equalize the output. The VGA 154 further has the capability of reporting a digital value on path 156 indicative of the gain being applied by the VGA at any given time. A servo digital signal processor (DSP) 158 carries out digital processing of the servo data in order to control the position of the head 120.

In order to properly operate, the AGC 152 has a specified input range, such as 100 to 1000 millivolts peak to peak (mV p–p). In other words, the AGC 152 can operate to normalize the input signals from the filter 146 to a range acceptable for use by remaining portions of the servo circuit 150, as long as the peak to peak amplitudes of the signals from the filter 146 fall within this range. While this may appear to be a substantial range, due to a number of factors including relatively large signal response variations of the heads 120 (which are preferably characterized as magneto-resistive heads) and process variations associated with the preamp 128, it can be difficult to select appropriate gain levels by the preamp 128 and the read channel gain stage 144 to have all signals from all heads meet this AGC input range.

To explain why this is so, it will first be noted that both the preamp 128 and the gain stage 144 are provided with adaptive gains, so that the gains applied by these respective circuits can be selected by the servo DSP 158 and the SCSI processor 148, respectively. Although the particular adaptability of these circuits will vary based on the design, for reference the preamp 128 can have gains of about 150×, 250× and 300× (i.e., the output peak to peak voltage of the readback signals is multiplied 150, 250 or 300 times the peak to peak voltage input). The gain stage 144 is contemplated as having an 8-bit resolution (i.e., relative gain values selectable from 00000000 to 11111111, or a total of 256 different settings). At first pass it would seem that the disc drive manufacturer could merely select appropriate gain values for these two circuits on a per head basis and easily meet the input range specified by the AGC 152.

However, in practice, such is not so easily implemented. Although the SCSI processor 148 is shown to be operably coupled to the servo DSP 158, and the two processors communicate during disc drive operation, such communication is only at a top level insufficient to allow adaptation of these gains on a per head basis. The servo DSP 158 controls head selection and positional control, whereas the SCSI processor 148 controls data transfer between the discs 106 and the host computer. Thus, although current head selection information may be made available to the SCSI processor 148 by the servo DSP 158, such is not always available real-time. Moreover, certain operations, such as rapid head switching among multiple heads such as carried out in a head ratcheting operation as the heads are repeatedly selected to read servo data from different disc surfaces to improve servo resolution, is either transparent or occurs too quickly for the SCSI processor 148 to be able to load the corresponding gains in the 144 for each head.

As a result of these and other related factors, it is common to provide one set of global gains for the preamp 128 and the gain stage 144 for use by all the heads 120. These values are selected during the design of the disc drive and are thereafter loaded as default values in all nominally identical manufactured drives.

Figure 3:
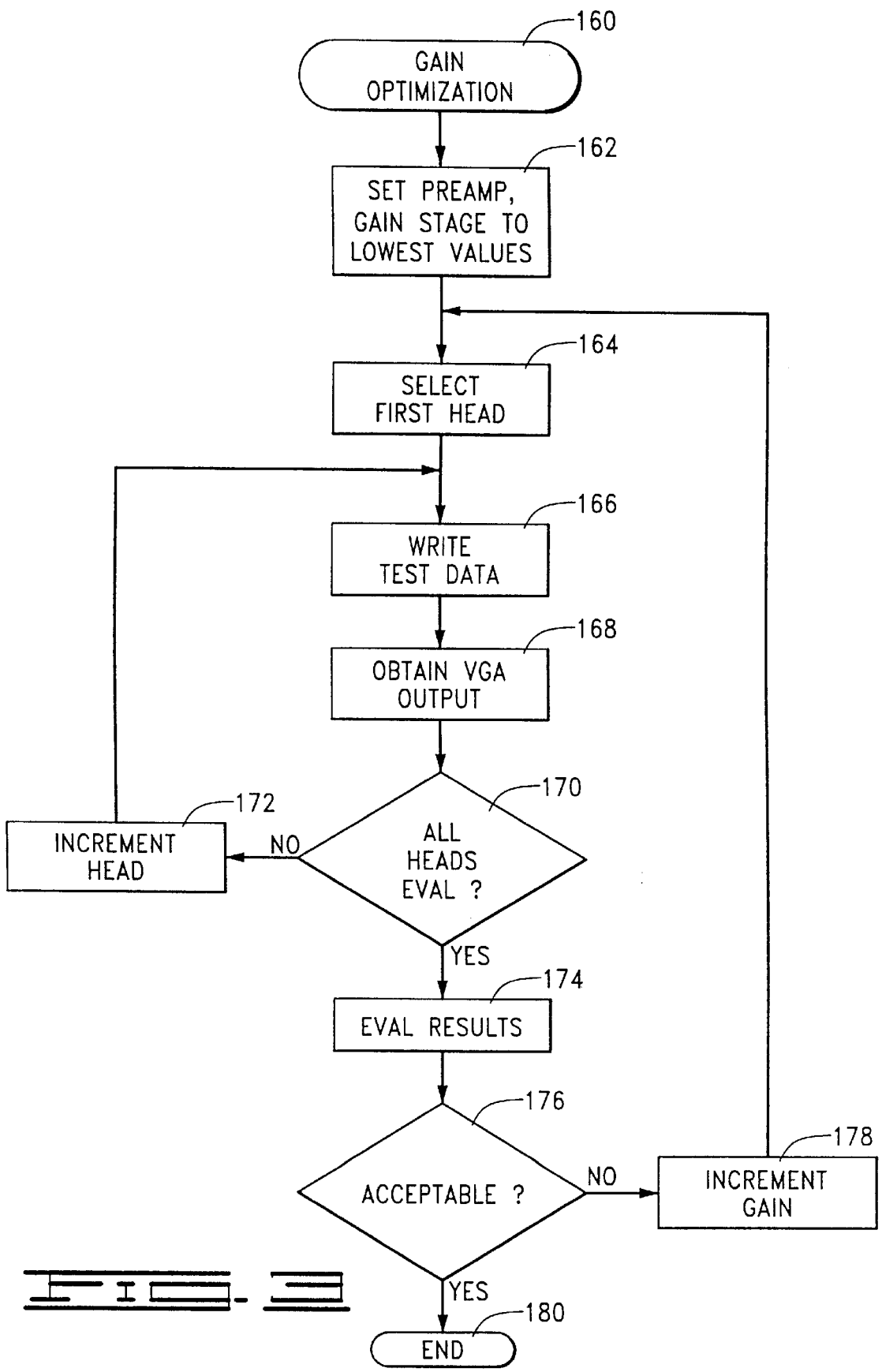
FIG. 3 is a flow chart for a GAIN OPTIMIZATION routine, carried out in accordance with preferred embodiments of the present invention to set optimum gain levels for the preamplifier and read channel gain stage of FIG. 2.

Accordingly, FIG. 3 provides a GAIN OPTIMIZATION routine 160 representative of steps carried out to select optimum values of the gain used by the preamp 128 and the gain stage 144 in accordance with preferred embodiments of the present invention. Preferably, the routine is representative of programming utilized by the SCSI processor 148.

At step 162, the routine first proceeds to set the gains of the preamp 128 and the gain stage 144 at the lowest values. Although other initial settings can be selected, the lowest values are preferably used by step 162, as excessive input amplitude has been generally been found to be a greater problem for the AGC 152 than insufficient input amplitude. The process continues to step 164 where the first head 120 is selected. At step 166, the servo circuit 150 proceeds to position the first selected head 120 over an appropriate location on the corresponding disc surface to write test data at a frequency nominally equal to the frequency of the servo data used by the servo circuit 150. The data are subsequently read and the ultimate gain selected by the VGA 154 to optimize the readback of these data are performed at step 168. It will be noted that a higher VGA value indicates that the AGC is working to increase the input amplitude, while a lower VGA value indicates that the AGC is working to decrease the input amplitude.

Decision step 170 determines whether similar VGA values have been obtained for all of the heads 120; if not, the next head is selected at step 172 and the process is repeated. When all of the heads 120 have been evaluated, the process continues to step 174 where the VGA values are evaluated to determine the acceptability of the preamp and gain stage settings for all of the heads 120. In one preferred embodiment, the variation in VGA values (either absolute range or calculation of a standard deviation) is evaluated by comparison to a threshold variation level. In another preferred embodiment, the average of the VGA values is evaluated to determine the extent to which the input amplitude range is near the output range (i.e., is a nominal amount of gain being applied by the VGA 154). In yet another embodiment, a threshold is not utilized; instead, measurements are taken for a plurality of different combinations of settings and the combination of settings that provides the best overall operation (as indicated by the VGA output value distribution) is selected.

When the results are deemed unacceptable (or additional data are desired), as indicated by decision step 176 the routine passes to incrementing step 178 where one or both of the gains are incremented. Preferably, because of the greater resolution afforded by the gain stage 144, the preamp 128 is maintained at the lowest setting (150x) and the gain of the gain stage 144 is successively incremented. Finally, once all the data have been collected, the flow passes to end at step 180 and the gain settings are stored for subsequent use during normal operation.

The routine of FIG. 3 is contemplated as being advantageously performed during manufacturing, although it may also be used at appropriate times during subsequent disc drive field operation, to account for changes in the operational characteristics of the disc drive 100.

In summary, it will be recognized that the present invention is directed to an apparatus and method for selecting an optimum gain in a disc drive. In a referred embodiment a disc drive 100 includes an amplifier 128, 144 which is used to amplify readback signals transduced from a magnetic recording disc 106. The amplifier is provided with a first value of gain, which is used to amplify a readback signal to generate an amplified readback signal. The amplified readback signal is in turn applied to an automatic gain control circuit comprising a variable gain amplifier. The variable gain amplifier applies a variable gain from a selected range to the amplified readback signal to maintain an amplitude of an output signal provided by the automatic gain control circuit at a nominal amplitude. The acceptability of the first value of gain for subsequent use by the amplifier is determined in relation to a magnitude of the variable gain applied by the variable gain amplifier.

For purposes of the appended claims, the phrase The terms "circuit" and "circuitry" will be understood to be realizable in hardware or firmware/programming. Method steps have been individually labeled for convenience, but are not necessarily limited to the order shown.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for selecting an optimum gain for an amplifier used to amplify readback signals transduced from a magnetic recording disc, comprising steps of:

(a) providing a first value of gain to the amplifier:

(b) using the amplifier to amplify a readback signal by the first value of gain to generate an amplified readback signal;

(c) applying the amplified readback signal to an automatic gain control circuit comprising a variable gain amplifier which operates to apply a variable gain over a selected range to the amplified readback signal to maintain an amplitude of an output signal provided by the automatic gain control circuit at a nominal amplitude, the automatic gain control circuit providing an indication of a magnitude of the variable gain; and (d) using the magnitude of the variable gain from step (c) to determine acceptability of the first value of gain for subsequent use by the amplifier.

2. The method of claim 1, further comprising steps of:

(e) providing a second value of gain to the amplifier;

(f) repeating steps (b) and (c) using the second value of gain; and (g) identifying a selected one of the first and second gains as the optimum gain in relation to the corresponding magnitudes of the variable gain from step (c).

3. The method of claim 2, wherein the identifying step (g) comprises identifying a midpoint of the selected range of variable gains, subtracting each of the corresponding magnitudes of the variable gain from the midpoint to form first and second difference values, and identifying the selected one of the first and second gains as the optimum gain in relation to the lesser of the first and second difference values.

4. The method of claim 1, wherein the disc drive comprises a plurality of heads, wherein steps (b) and (c) are repeated for readback signals from each of the heads in turn to generate a population of magnitudes of the variable gain, and wherein the acceptability of the first value of gain is determined in relation to a distribution of the population of magnitudes of the variable gain.

5. The method of claim 1, wherein the using step (d) comprises determining the acceptability of the first value of gain for subsequent use by the amplifier in relation to relative placement of the magnitude of the variable gain with respect to the selected range of the variable gain.

6. The method of claim 1, wherein the amplifier comprises a preamplifier of a disc drive which provides initial preamplification of readback signals from a head of the disc drive.

7. The method of claim 1, wherein the amplifier comprises a gain stage of a read channel of the disc drive.

8. A disc drive, comprising:

a rotatable disc with a recording surface on which a plurality of tracks are defined;

a head supported adjacent the recording surface which generates a readback signal in response to selective magnetization of the recording surface;

an amplifier which applies a first gain value to the readback signal to provide an amplified readback signal;

an automatic gain control circuit, operably coupled to receive the amplified readback signal, comprising a variable gain amplifier which applies a variable gain from a range of variable gains to the amplified readback signal to maintain an amplitude of an output signal at a nominal amplitude, the automatic gain control circuit providing an indication of a magnitude of the variable gain applied to the amplified readback signal; and a gain selection circuit which selects an optimum gain for the amplifier in relation to the magnitude of the variable gain applied by the variable gain amplifier.

9. The disc drive of claim 8, wherein the disc drive comprises a plurality of heads, wherein readback signals are generated by each of the heads in turn, the readback signals amplified by the amplifier and passed to the automatic gain control circuit to generate a population of magnitudes of the variable gain, and wherein the acceptability of the first value of gain is determined in relation to a distribution of the population of magnitudes of the variable gain.

10. The disc drive of claim 8, wherein the amplifier comprises a preamplifier which provides initial preamplification of readback signals from the head, the preamplifier mechanically coupled to the head.

11. The disc drive of claim 8, wherein the amplifier comprises a gain stage of a read channel of the disc drive.

12. A disc drive, comprising:

an amplifier which applies a gain of selected magnitude to a readback signal transduced from a magnetic recording disc; and gain selection means for selecting an optimum magnitude of the gain.

* * * * *

UNITED STATES PATENT AND TRADEMARK OFFICE
CERTIFICATE OF CORRECTION

| | |
|---|---|
| PATENT NO. | : 6,268,974 B1 |
| DATED | : July 31, 2001 |
| INVENTOR(S) | : Brett A. Sloan, Paul F. Kusbel, John E. Moon and Timothy T. Walker |

It is certified that error appears in the above-identified patent and that said Letters Patent is hereby corrected as shown below:

<u>Column 3,</u>
Line 15, replace "VCM)" with -- (VCM) --.

Signed and Sealed this

Thirtieth Day of April, 2002

*Attest:*

JAMES E. ROGAN
*Attesting Officer*     *Director of the United States Patent and Trademark Office*